US009037994B2

(12) United States Patent
Advani

(10) Patent No.: US 9,037,994 B2
(45) Date of Patent: May 19, 2015

(54) NAVIGATION TO A DATA DEFINITION IN A DIFF CONTEXT

(75) Inventor: Pavan L. Advani, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 13/533,016

(22) Filed: Jun. 26, 2012

(65) Prior Publication Data
US 2013/0346909 A1     Dec. 26, 2013

(51) Int. Cl.
*G06F 17/22*     (2006.01)
*G06F 9/44*      (2006.01)
*G06F 3/048*     (2013.01)

(52) U.S. Cl.
CPC .. *G06F 8/33* (2013.01); *G06F 8/71* (2013.01); *G06F 17/2211* (2013.01); *G06F 17/2288* (2013.01)

(58) Field of Classification Search
CPC ....................................... G06F 3/048
USPC ....................................... 715/781
See application file for complete search history.

(56) References Cited

U.S. PATENT DOCUMENTS

| 5,832,520 | A | 11/1998 | Miller et al. |
| 5,860,071 | A | 1/1999 | Ball et al. |
| 6,148,340 | A | 11/2000 | Bittinger et al. |
| 6,560,620 | B1 * | 5/2003 | Ching .......................... 715/229 |
| 6,829,733 | B2 | 12/2004 | Richardson et al. |
| 6,848,078 | B1 * | 1/2005 | Birsan et al. .................. 715/206 |
| 7,171,462 | B1 | 1/2007 | Kavasseri et al. |
| 7,571,427 | B2 * | 8/2009 | Wang et al. .................... 717/122 |
| 7,636,728 | B2 | 12/2009 | Novak |
| 7,890,464 | B2 | 2/2011 | Reinsch |
| 2006/0015863 | A1 | 1/2006 | Vaidyanathan et al. |
| 2007/0143680 | A1 * | 6/2007 | Cowan et al. ................. 715/713 |
| 2008/0162888 | A1 * | 7/2008 | Krauss ......................... 712/216 |
| 2008/0301736 | A1 * | 12/2008 | Heilbron et al. ................ 725/61 |
| 2009/0313308 | A1 * | 12/2009 | Green et al. ................... 707/202 |
| 2011/0197121 | A1 * | 8/2011 | Kletter .......................... 715/234 |
| 2012/0254835 | A1 * | 10/2012 | Muddu et al. ................. 717/121 |
| 2013/0332902 | A1 * | 12/2013 | Wang et al. ................... 717/122 |

FOREIGN PATENT DOCUMENTS

EP     0981090 A1    2/2000

OTHER PUBLICATIONS

Peter Kuo, ZK Studio New Features, Dec. 4 2009, ZK Studio 0.9.6, 36.*
Eppili, A., "Approaches to improve the performance of storage and processing-subsystems in WebVigiL," [online] The University of Texas at Arlington, Apr. 2005, Pub. No. 1425124, retrieved from the Internet: <itlab.uta.edu/itlabweb/students/sharma/theses/ajay.pdf>, 134 pgs.

* cited by examiner

*Primary Examiner* — Jennifer To
*Assistant Examiner* — Hugo Molina
(74) *Attorney, Agent, or Firm* — Cuenot, Forsythe & Kim, LLC

(57) ABSTRACT

Navigation to a data definition in a diff context. A diff comparison can be generated between at least two versions of a first file. The diff comparison can identify syntax of at least a first method identified in a portion of syntax that is different between the at least two versions of the first file, the first method defined by a data definition in a second file. The diff comparison can configure syntax of the first method to be a first navigable block of data in at least one of the versions of the first file. At least two versions of the first file can be presented to a user in a file difference window, and a user input can be received selecting the first navigable block of data. Responsive to the user input, the second file can be presented to the user in the file difference window.

17 Claims, 5 Drawing Sheets

500

502 Receive a user input selecting two or more versions of a first file

504 Generate a first diff comparison between at least two versions of a first file, the first diff comparison identifying syntax of at least a first method identified in a portion of syntax that is different between the at least two versions of the first file, the first method referencing a first data definition in a second file, and the first diff comparison configuring syntax of the first method to be a first navigable block of data in at least one of the versions of the first file

506 Present to the user the selected versions of the first file in a file difference window

508 Receive a user input selecting the first navigable block of data

510 Optionally, responsive to the user input selecting the first navigable block of data, present to the user in the file difference window a call hierarchy, the call hierarchy identifying at least a second data definition which defines a second method called by the first method

512 Generate a second diff comparison between two or more versions of the second file, the second diff comparison identifying syntax of at least a second method identified in the portion of syntax that is different between the two or more versions of the second file, the second method referencing a second data definition in a third file, and the second diff comparison configuring syntax of the second method to be a navigable block of data in at least one of the versions of the second file and indicating a difference between the at least two versions of the second file

514 Responsive to the user input, present to the user the second file in the file difference window

FIG. 5

NAVIGATION TO A DATA DEFINITION IN A DIFF CONTEXT

BACKGROUND

The present arrangements generally relate to the use of a file difference viewer to present different versions of a file.

A file difference editor is a utility configured to present different versions of a file. Within the file difference editor, different versions of the file are presented. In some instances, a diff comparison is generated to indicate the differences between the different versions. For example, a file difference editor may include a diff comparison utility to generate the diff comparison. The results contained in the diff comparison can be presented in one or more versions of the file, or output to a diff file.

BRIEF SUMMARY

One or more embodiments disclosed within this specification relate to navigation to a data definition in a diff context.

An embodiment can include a method. The method can include, via a processor, generating a first diff comparison between at least two versions of a first file, the first diff comparison identifying syntax of at least a first method identified in a portion of syntax that is different between the at least two versions of the first file, the first method referencing a first data definition in a second file, and the first diff comparison configuring syntax of the first method to be a first navigable block of data in at least one of the versions of the first file. The method further can include presenting to a user the at least two versions of the first file in a file difference window, and receiving a user input selecting the first navigable block of data. Responsive to the user input, the second file can be presented to the user in the file difference window.

Another embodiment can include a data processing system comprising a processor configured to initiate executable operations. The executable operations can include generating a first diff comparison between at least two versions of a first file, the first diff comparison identifying syntax of at least a first method identified in a portion of syntax that is different between the at least two versions of the first file, the first method referencing a first data definition in a second file, and the first diff comparison configuring syntax of the first method to be a first navigable block of data in at least one of the versions of the first file. The executable operations further can include presenting to a user the at least two versions of the first file in a file difference window, and receiving a user input selecting the first navigable block of data. Responsive to the user input, the second file can be presented to the user in the file difference window.

Another embodiment can include a computer program product for navigating to a data definition in a diff context. The computer program product can include a computer-readable storage medium having stored thereon program code that, when executed, configures a processor to perform operations. The executable operations can include generating a first diff comparison between at least two versions of a first file, the first diff comparison identifying syntax of at least a first method identified in a portion of syntax that is different between the at least two versions of the first file, the first method referencing a first data definition in a second file, and the first diff comparison configuring syntax of the first method to be a first navigable block of data in at least one of the versions of the first file. The executable operations further can include presenting to a user the at least two versions of the first file in a file difference window, and receiving a user input selecting the first navigable block of data. Responsive to the user input, the second file can be presented to the user in the file difference window.

BRIEF DESCRIPTION OF THE SEVERAL VIEWS OF THE DRAWINGS

FIG. 5 is a flow chart illustrating a method of navigating to a data definition in a diff context in accordance with another embodiment disclosed within this specification.

DETAILED DESCRIPTION

Figure 1:
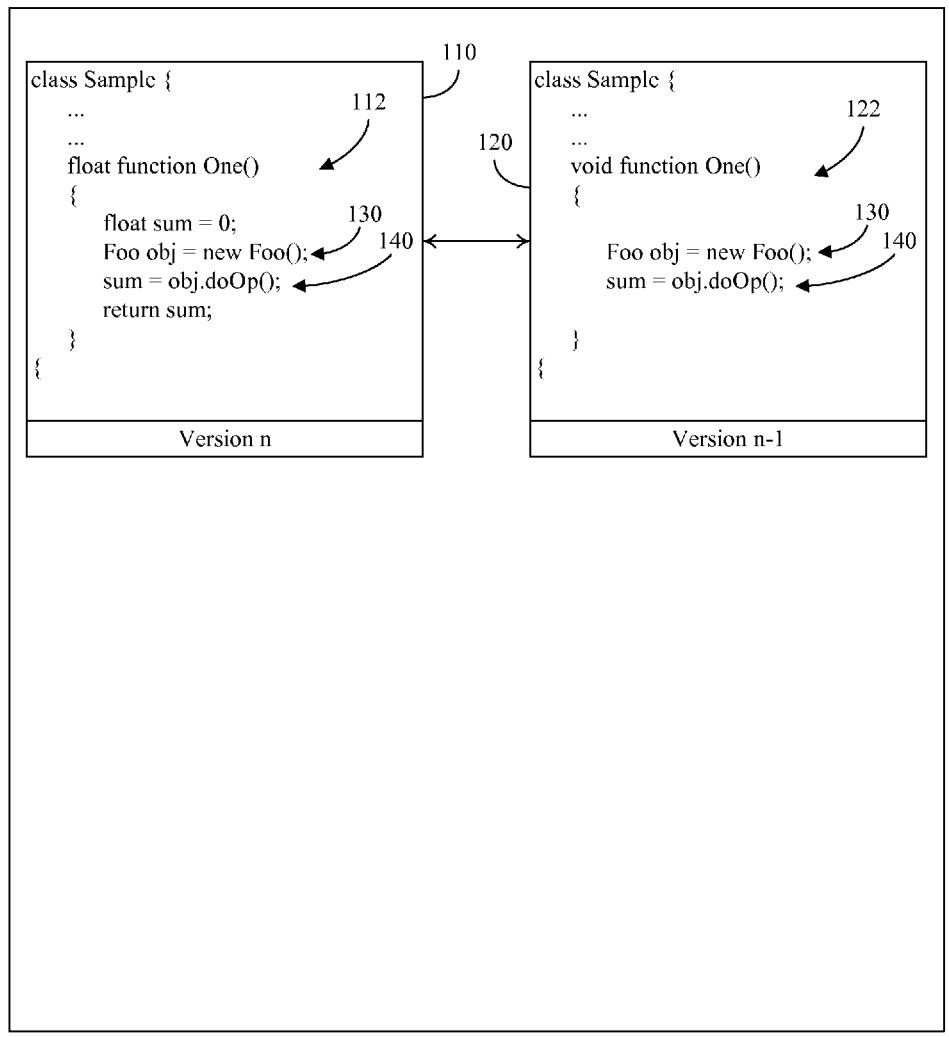
FIG. 1 depicts a view of a file difference window presented in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with the arrangements described herein, a diff comparison can be generated between two or more versions of a file. The diff comparison can identify syntax of methods contained in the file that are affected by changes between the various versions, and configure the syntax to be navigable blocks of data in the various versions, and identify the navigable blocks of data in a suitable manner, for example using a particular font color, font text, or the like. As such, the diff comparison can indicate differences between the various versions.

The navigable blocks of data can be user selectable. A user can select the navigable blocks of data to open other files that define other data definitions, such as defined classes, referenced by the methods. In illustration, if the user selects a navigable block of data associated with a particular method, a second file that defines a data definition referenced by that method can be opened. Moreover, the file can be presented in the same file difference window in which the various versions of the first file are presented. Further, a diff comparison can be generated for various versions of the second file, and such versions can be presented in the file difference window with additional navigable blocks of data. The user can select these navigable blocks of data to open additional files, and so on.

In addition, syntax for functions identified in the various versions of the files can be configured to be navigable blocks of data. The user can select such navigable blocks of data to open files containing corresponding function declarations, corresponding call hierarchies, and the like.

Accordingly, the user can navigate to various versions of the files to view changes, evaluate how changes to various files affect other files, and so on, all within the same window. Such functionality can greatly increase programmer efficiency in the computer programming and de-bugging process.

Several definitions that apply throughout this document will now be presented.

As used herein, the term "class" means a construct that is used in a computer program to create instances of itself. Such instances may be referred to as class instances, class objects, instance objects or simply objects.

As used herein, the term "method" means a subroutine, procedure or function associated with a class, and defines the behavior to be exhibited by instances of the associated class at program run time.

As used herein, the term "diff context" means a particular session in a particular file difference viewer in which two or more versions of a file are compared. In this regard, the term "diff context" refers to a single session in a single file difference viewer. As used herein, a "file difference viewer" is an application or utility in which differences between two or more versions of a file are viewed (e.g., presented on a display). A file difference viewer may be embodied in, or as, a file difference editor, but this need not be the case.

As used herein, the term "diff comparison" means a programmatic action executed by at least one processor to compare different versions of a file.

As used herein, the term "window" means an enclosed area presented by a graphical user interface on a display in which only a single view generated by a single instance of an executing application or utility is presented. In this regard, a window is distinct from a desktop presented by an operating system, and the window is presented over the desktop. As used herein, the term "file difference window" means a window in which differences between two or more versions of one or more files are depicted. A file difference window can, for example, be presented by a file difference viewer.

As used herein, the term "navigable block of data" means a group of one or more characters or symbols that is user selectable to initiate a programmatic action executed by at least one processor.

As used herein, the term "user" means a person (i.e., human being). A user can be, for example, a computer programmer.

FIG. 1 depicts a view of a file difference window (hereinafter "window") 100 presented in a diff context in accordance with one embodiment disclosed within this specification. The window 100 can be presented on a display coupled to, or integrated with, a suitable processing system, for example a general purpose computer comprising at least one processor and memory. The window 100 can be presented by a file difference viewer executing on the processing system, which can include a user interface for receiving user inputs and presenting the window 100.

Via the user interface, a user can select a particular version 110 of a file to be presented in the window 100. In addition, the user can select a previous version 120 of the file in order to cause the previous version 120 to be presented in the window 100 and execute a diff comparison between the version 110 and the version 120. The version 120 can be a version that immediately precedes the version 110, or another prior version of the file. Responsive to the user selections, the versions 110, 120 can be presented in the window 100.

When the diff comparison between the versions 110, 120 is executed, the diff comparison can identify differences between the versions 110, 120. For example, the diff comparison can apply one or more effects to the syntax 112, 122 that distinguishes the syntax 112, 122 from other syntax in the versions 110, 120, and thus identify the differences. The effects can be visual effects, such as a particular color of font for the syntax 112, 122, underlining the syntax 112, 122, italicizing the syntax 112, 122, presenting the syntax 112, 122 in bold font or a different type of font, applying highlighting to the syntax 112, 122, or any other suitable effects.

Further, the diff comparison can identify one or more portions of the syntax 112, 122, such as syntax 130, corresponding to one or more methods identified the first version 110 or the second version 120 of the file that reference one or more data definitions, such as classes, defined in one or more other files. For example, the diff comparison can identify syntax 130 for the method "Foo obj=new Foo( )." The diff comparison can apply one or more effects to the syntax 130 to distinguish the method 130 from the rest of the syntax 112, 122 and any other syntax presented in the versions 110, 120. Further, the first diff comparison can configure syntax 130, or a portion of the syntax 130, to be a navigable block of data in at least one of the versions 110, 120 of the first file.

Figure 2:
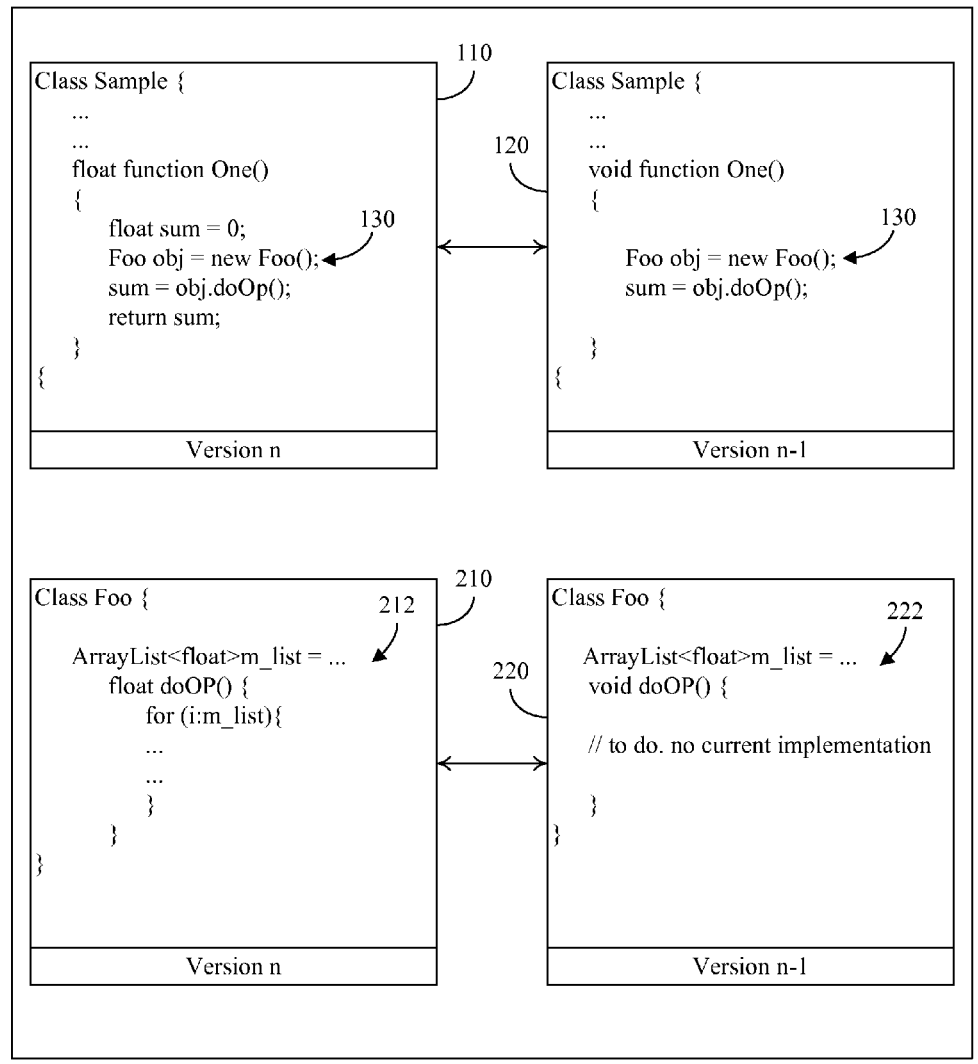
FIG. 2 depicts another view of the file difference window depicted in FIG. 1.

The file difference viewer can receive a user input selecting one or more of the navigable blocks of data in either of the versions 110, 120. In response to receiving a user input selecting the syntax 130, the file difference viewer can present to the user, in the window 100, the other file in which a data definition referenced by the method in the syntax 130 is defined. In illustration, if the syntax 130 references a class "Foo," the file in which the class "Foo" is defined, as well as methods defined in the class "Foo," can be presented in the window 100, as depicted in FIG. 2. Moreover, a plurality of versions of such file(s) that correspond to the versions 110, 120 can be presented.

Reference now is made to FIG. 2. In FIG. 2, a version 210 of the file that defines the class "Foo," and that corresponds to version 110, and a version 220 of the file that defines the class "Foo," can be presented in the window 100 in response to the user selecting the syntax 130. The file version 210 can correspond to the file version 110 if the file version 210 is used with the file version 210 in a system (e.g., application or set of applications), and the file version 220 can correspond to the file version 120 if the file version 220 is used with the file version 220 in the system. In this regard, the versions 110, 210 each can be assigned the same version identifier, and the versions 120, 220 each can be assigned the same version identifier, though this need not be the case so long as some other method is implemented that indicates which versions 210, 220 of the second file (e.g., "Class Foo") correspond to which versions 110, 120 of the first file (e.g., "Class Sample").

Further, the diff comparison can be executed to identify differences between the versions 210, 220. Again, the diff comparison can apply one or more effects to the syntax 212, 222 that distinguishes the syntax 212, 222 from other syntax in the versions 210, 220, and thus identify the differences. If one or more portions of the syntax 212, 222 references one or more data definitions, such as defined classes, in one or more other files, one or more effects again can be applied to such portions of the syntax 212, 222, and the syntax for such portions, or portions of such syntax 212, 222, can be configured to be a navigable block of data, or navigable blocks of data, in the versions 210, 220, as previously described. Again, if the user selects such a navigable block of data, the file difference viewer can present to the user, in the window 100, the other file in which the data definition referenced in such syntax is defined, as well as one or more methods defined in the referenced data definition. These processes can be applied recursively to any number of files that are presented in the window 100 when the user selects corresponding navigable blocks of data.

By configuring the syntax 130, and other identified syntax, to be navigable blocks of data which the user may select to cause other related files containing data definitions to be presented in the window 100, the present arrangements facilitate programming and debugging of computer program code. Moreover, because the diff comparison is automatically executed each time a related file is selected using a navigable block of data, the user need not manually initiate the diff comparison for each new file in order to view changes between various versions. Thus, the present arrangements can save the user a significant amount of time when computer programming/debugging one or more applications. Presenting the respective versions 110, 120, 210, 220 of each of the files within a single window 100 in the diff context further increases user efficiency.

Figure 3:
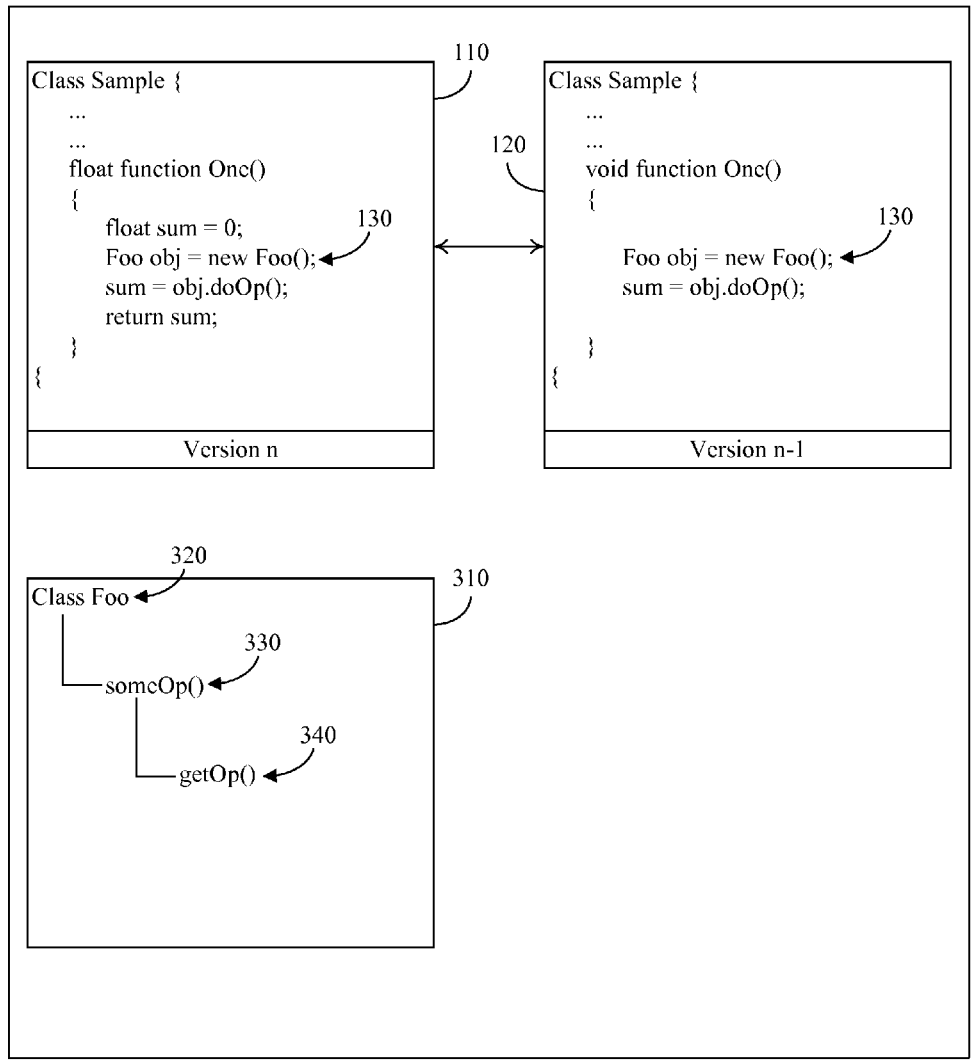
FIG. 3 depicts another view of the file difference window depicted in FIG. 1.

Referring again to FIG. 1, when the user selects the navigable block corresponding to the syntax 130, and the class "Foo" 320 calls one or more other data definitions, a call hierarchy 310 can presented in the window 100, for example as depicted in FIG. 3. The call hierarchy 310 can be presented in addition to, or in lieu of, a file (or versions of the file) in which the class "Foo" 320 is defined. The hierarchy 310 can identify one or more other data definitions, such as a class 330, which define one or more methods called by a method defined in the class 320. The hierarchy 310 also can identify one or more other data definitions, such as a class 340, which define one or more methods called by the method defined in the class 330, and so on.

Figure 4:
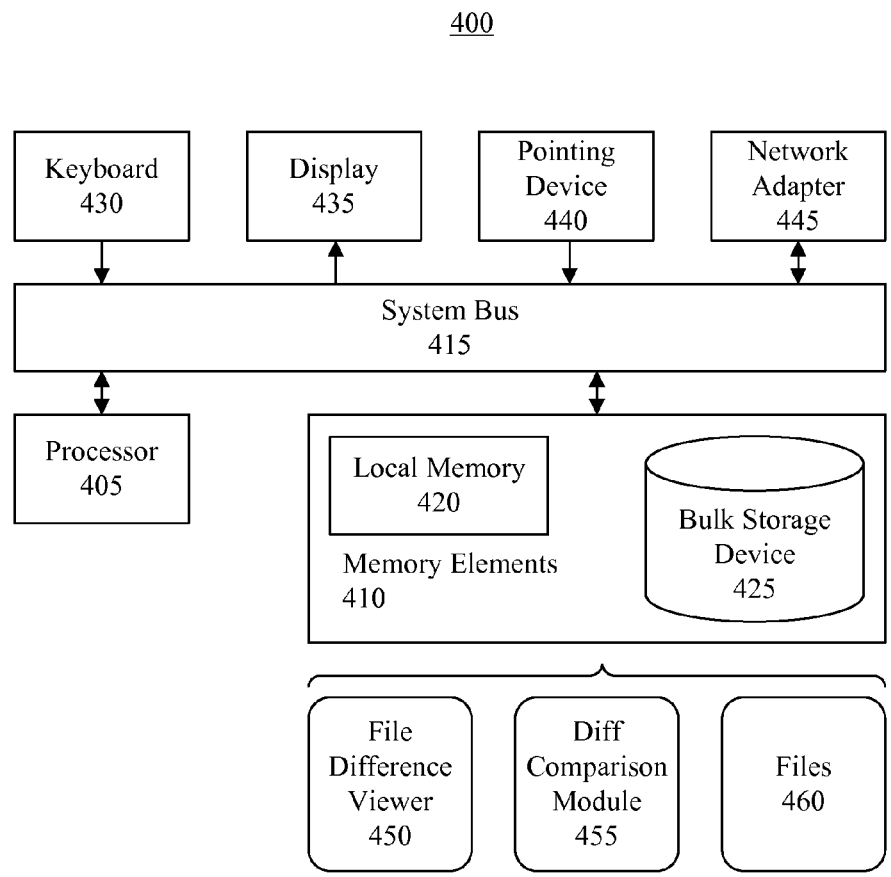
FIG. 4 is a block diagram illustrating a system for navigating to a data definition in a diff context in accordance with one embodiment disclosed within this specification.

FIG. 4 is a block diagram illustrating a data processing system 400 (hereinafter "system 400") for navigating to a data definition in a diff context in accordance with one embodiment disclosed within this specification. The system 400 can include at least one processor 405 coupled to memory elements 410 through a system bus 415 or other suitable circuitry. As such, the system 400 can store program code within the memory elements 410. The processor 405 can execute the program code accessed from the memory elements 410 via the system bus 415. In one aspect, for example, system 400 can be implemented as a computer that is suitable for storing and/or executing program code. It should be appreciated, however, that the system 400 can be implemented in the form of any system including a processor and memory that is capable of performing the functions and/or operations described within this specification.

The memory elements 410 can include one or more physical memory devices such as, for example, local memory 420 and one or more bulk storage devices 425. Local memory 420 refers to RAM or other non-persistent memory device(s) generally used during actual execution of the program code.

The bulk storage device(s) 425 can be implemented as a hard disk drive (HDD), solid state drive (SSD), or other persistent data storage device. The system 400 also can include one or more cache memories (not shown) that provide temporary storage of at least some program code in order to reduce the number of times program code must be retrieved from the bulk storage device 425 during execution.

Input/output (I/O) devices such as a keyboard 430, a display 435, and a pointing device 440 optionally can be coupled to the system 400. The I/O devices can be coupled to the system 400 either directly or through intervening I/O controllers. One or more network adapters 445 also can be coupled to the system 400 to enable the system 400 to become coupled to other systems, computer systems, remote printers, and/or remote storage devices through intervening private or public networks. Modems, cable modems, and Ethernet cards are examples of different types of network adapters 445 that can be used with the system 400.

As pictured in FIG. 4, the memory elements 410 can store the difference viewer 450, a diff comparison module 455 and files 460. The difference viewer 450 and a diff comparison module 455, being implemented in the form of executable program code, can be executed by the system 400 and, as such, can be considered part of system 400. The difference viewer 450 can be executed by the processor 405 to perform the functions and processes described with reference FIGS. 1, 2 and 3 to present various versions of the files 460 and the call hierarchy in the window as described. The diff comparison module 455 can be executed by the processor 405 to perform diff comparisons between different versions of respective files 460, identify syntax, apply effects to syntax, configure syntax to be navigable blocks of data, identify files in response to user selection of the navigable blocks of data, generate a call hierarchy, etc., for example as described with reference to FIGS. 1, 2 and 3.

FIG. 5 is a flow chart illustrating a method 500 of navigating to a data definition in a diff context in accordance with another embodiment disclosed within this specification. At step 502, one or more user inputs can be received selecting two or more versions of a first file. At step 504 a first diff comparison can be generated between two or more versions of the first file. The first diff comparison can identify syntax of at least a first method identified in a portion of syntax that is different between the at least two versions of the first file, the first method referencing a first data definition, such as a defined class, in a second file. The first diff comparison can configure syntax of the first method to be a first navigable block of data in at least one of the versions of the first file.

At step 506, the selected versions of the first file can be presented in a file difference window. At least one effect can be applied that distinguishes the portion of syntax in a first of the two versions from the portion of syntax in a second of the two versions. Further, at least one effect can be applied that distinguishes the syntax of the method in a first of the two versions from syntax of the method in a second of the two versions.

At step 508, a user input can be received selecting the first navigable block of data. At step 510, optionally, responsive to the user input selecting the first navigable block of data, a call hierarchy can be presented to the user in the file difference window. The call hierarchy can identify at least a second data definition which defines a second method called by the first method. The call hierarchy further can identify at least a third data definition which defines a third method called by the second method.

At step 512, a second diff comparison between the two or more versions of the second file. The second diff comparison can identify syntax of at least a second method identified in the portion of syntax that is different between the two or more versions of the second file. The second method can reference a second data definition in a third file, and the second diff comparison can configure syntax of the second method to be a navigable block of data in at least one of the versions of the second file.

At step 514, responsive to the user input, the second file can be presented in the file difference window. For example, at least two versions of the second file can be presented.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of navigating to a data definition in a diff context, the method comprising:
    via a processor, generating a first diff comparison between at least two versions of a first file, the first diff comparison identifying syntax of at least a first method identified in a portion of syntax that is different between the at least two versions of the first file, the first method referencing a first data definition in a second file, and the first diff comparison configuring syntax of the first method to be a first navigable block of data in at least one of the versions of the first file;
    presenting to a user the at least two versions of the first file in a file difference window;
    receiving a user input selecting the first navigable block of data;
    responsive to the user input, presenting to the user the second file in the file difference window; and
    generating a second diff comparison between at least two versions of the second file, the second diff comparison identifying syntax of at least a second method identified in the portion of syntax that is different between the at least two versions of the second file, the second method referencing a second data definition in a third file, and the second diff comparison configuring syntax of the second method to be a navigable block of data in at least one of the versions of the second file;
    wherein presenting to the user the second file in the file difference window comprises presenting the at least two versions of the second file in the file difference window.

2. The method of claim 1, wherein the versions of the second file correspond to respective versions of the first file.

3. The method of claim 1, further comprising:
    applying at least one effect that distinguishes the portion of syntax in a first of the two versions from the portion of syntax in a second of the two versions.

4. The method of claim 1, further comprising:
    applying at least one effect that distinguishes the syntax of the method in a first of the two versions from syntax of the method in a second of the two versions.

5. The method of claim 1, further comprising:
    responsive to the user input selecting the first navigable block of data, presenting to the user in the file difference window a call hierarchy, the call hierarchy identifying at least a second data definition which defines a second method called by the first method.

6. The method of claim 5, wherein the call hierarchy further identifies at least a third data definition which defines a third method called by the second method.

7. A data processing system comprising:
    a processor configured to initiate executable operations comprising:
    generating a first diff comparison between at least two versions of a first file, the first diff comparison identifying syntax of at least a first method identified in a portion of syntax that is different between the at least two versions of the first file, the first method referencing a first data definition in a second file, and the first diff comparison configuring syntax of the first method to be a first navigable block of data in at least one of the versions of the first file;
    presenting to a user the at least two versions of the first file in a file difference window;
    receiving a user input selecting the first navigable block of data;
    responsive to the user input, presenting to the user the second file in the file difference window; and
    generating a second diff comparison between at least two versions of the second file, the second diff comparison identifying syntax of at least a second method identified in the portion of syntax that is different between the at least two versions of the second file, the second method referencing a second data definition in a third file, and the second diff comparison configuring syntax of the second method to be a navigable block of data in at least one of the versions of the second file;
    wherein presenting to the user the second file in the file difference window comprises presenting the at least two versions of the second file in the file difference window.

8. The data processing system of claim 7, wherein the versions of the second file correspond to respective versions of the first file.

9. The data processing system of claim 7, wherein the processor further is configured to initiate executable operations comprising:
    applying at least one effect that distinguishes the portion of syntax in a first of the two versions from the portion of syntax in a second of the two versions.

10. The data processing system of claim 7, wherein the processor further is configured to initiate executable operations comprising:
    applying at least one effect that distinguishes the syntax of the method in a first of the two versions from syntax of the method in a second of the two versions.

11. The data processing system of claim 7, wherein the processor further is configured to initiate executable operations comprising:
    responsive to the user input selecting the first navigable block of data, presenting to the user in the file difference window a call hierarchy, the call hierarchy identifying at least a second data definition which defines a second method called by the first method.

12. The data processing system of claim 11, wherein the call hierarchy further identifies at least a third data definition which defines a third method called by the second method.

13. A computer program product for navigating to a data definition in a diff context, said computer program product comprising:
   a computer-readable storage device, wherein the computer-readable storage device is not a transitory, propagating signal per se, having stored thereon program code that, when executed, configures a processor to perform executable operations comprising:
   generating a first diff comparison between at least two versions of a first file, the first diff comparison identifying syntax of at least a first method identified in a portion of syntax that is different between the at least two versions of the first file, the first method referencing a first data definition in a second file, and the first diff comparison configuring syntax of the first method to be a first navigable block of data in at least one of the versions of the first file;
   presenting to a user the at least two versions of the first file in a file difference window;
   receiving a user input selecting the first navigable block of data;
   responsive to the user input, presenting to the user the second file in the file difference window; and
   generating a second diff comparison between at least two versions of the second file, the second diff comparison identifying syntax of at least a second method identified in the portion of syntax that is different between the at least two versions of the second file, the second method referencing a second data definition in a third file, and the second diff comparison configuring syntax of the second method to be a navigable block of data in at least one of the versions of the second file;
   wherein presenting to the user the second file in the file difference window comprises presenting the at least two versions of the second file in the file difference window.

14. The computer program product of claim 13, wherein the versions of the second file correspond to respective versions of the first file.

15. The computer program product of claim 13, the executable operations further comprising:
   applying at least one effect that distinguishes the portion of syntax in a first of the two versions from the portion of syntax in a second of the two versions.

16. The computer program product of claim 13, the executable operations further comprising:
   applying at least one effect that distinguishes the syntax of the method in a first of the two versions from syntax of the method in a second of the two versions.

17. The computer program product of claim 13, the executable operations further comprising:
   responsive to the user input selecting the first navigable block of data, presenting to the user in the file difference window a call hierarchy, the call hierarchy identifying at least a second class which defines a second method called by the first method.

* * * * *